(12) United States Patent
Fujiyama et al.

(10) Patent No.: US 11,652,237 B2
(45) Date of Patent: May 16, 2023

(54) NONAQUEOUS ELECTROLYTE SOLUTION INCLUDING BORON COMPOUND ADDITIVE HAVING HIGHER REDUCTIVE DECOMPOSITION POTENTIAL THAN ADDITIONAL ADDITIVE AND LITHIUM SECONDARY BATTERY INCLUDING THE SAME

(71) Applicant: MITSUI CHEMICALS, INC., Tokyo (JP)

(72) Inventors: Satoko Fujiyama, Kisarazu (JP); Kei Sugawara, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 240 days.

(21) Appl. No.: 16/641,041

(22) PCT Filed: Aug. 13, 2018

(86) PCT No.: PCT/JP2018/030240
§ 371 (c)(1),
(2) Date: Feb. 21, 2020

(87) PCT Pub. No.: WO2019/039346
PCT Pub. Date: Feb. 28, 2019

(65) Prior Publication Data
US 2021/0126288 A1    Apr. 29, 2021

(30) Foreign Application Priority Data
Aug. 24, 2017 (JP) .............................. JP2017-161287

(51) Int. Cl.
*H01M 10/0567* (2010.01)
*H01M 10/0525* (2010.01)
(Continued)

(52) U.S. Cl.
CPC ... *H01M 10/0567* (2013.01); *H01M 10/0525* (2013.01); *H01G 9/035* (2013.01); *H01G 11/64* (2013.01); *H01M 2300/0025* (2013.01)

(58) Field of Classification Search
CPC ...................... H01M 10/0567; H01M 10/0525
(Continued)

(56) References Cited

U.S. PATENT DOCUMENTS

2006/0188787 A1  8/2006 Nakanishi et al.
2008/0254370 A1  10/2008 Lee et al.
(Continued)

FOREIGN PATENT DOCUMENTS

CN    109103500 A  * 12/2018  .......... H01M 10/052
JP    H11250933 A     9/1999
(Continued)

OTHER PUBLICATIONS

International Search Report (PCT/ISA/210) and an English translation thereof, and Written Opinion (PCT/ISA/237) dated Nov. 13, 2018, by the Japanese Patent Office as the International Searching Authority for International Application No. PCT/JP2018/030240.
International Search Report (PCT/ISA/210) and an English translation thereof, and Written Opinion (PCT/ISA/237) dated Nov. 13, 2018, by the Japanese Patent Office as the International Searching Authority for International Application No. PCT/JP2018/030239.

*Primary Examiner* — Sean P Cullen
(74) *Attorney, Agent, or Firm* — Buchanan Ingersoll & Rooney PC

(57) ABSTRACT

Provided is a nonaqueous electrolyte solution for batteries, which contains an additive A that is composed of a boron compound represented by formula (1), and an additive B that has a lower reductive decomposition potential than the Additive A, in which n represents an integer from 1 to 5, $M^+$ represents an $Li^+$ ion or an $H^+$ ion, and when n is an integer from 2 to 5, more than one $M^+$ may be the same as or different from each other.

(Continued)

(1)

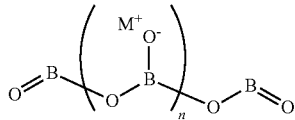

7 Claims, 3 Drawing Sheets

(51) Int. Cl.
*H01G 9/035* (2006.01)
*H01G 11/64* (2013.01)
(58) Field of Classification Search
USPC .................................................. 429/188, 322
See application file for complete search history.

(56) References Cited

U.S. PATENT DOCUMENTS

| | | | |
|---|---|---|---|
| 2009/0111020 A1* | 4/2009 | Yamaguchi | H01M 10/0568 |
| | | | 429/231.95 |
| 2009/0233176 A1 | 9/2009 | Kita et al. | |

FOREIGN PATENT DOCUMENTS

| | | | |
|---|---|---|---|
| JP | 2000048828 A | | 2/2000 |
| JP | 2005071617 A | | 3/2005 |
| JP | 2006236653 A | | 9/2006 |
| JP | 2008510287 A | | 4/2008 |
| JP | 4366724 B2 | | 11/2009 |
| JP | 2015232923 A | | 12/2015 |
| JP | 2016051600 A | * | 4/2016 |
| JP | 2016051600 A | | 4/2016 |
| JP | 2016066595 A | | 4/2016 |
| JP | 2017-139085 A | | 8/2017 |
| WO | 2007072759 A1 | | 6/2007 |

\* cited by examiner

NONAQUEOUS ELECTROLYTE SOLUTION INCLUDING BORON COMPOUND ADDITIVE HAVING HIGHER REDUCTIVE DECOMPOSITION POTENTIAL THAN ADDITIONAL ADDITIVE AND LITHIUM SECONDARY BATTERY INCLUDING THE SAME

TECHNICAL FIELD

The present disclosure relates to a nonaqueous electrolyte solution for a battery and a lithium secondary battery.

BACKGROUND ART

In recent years, a lithium secondary battery has been widely used as a power source for electronic devices such as mobile phones and laptop computers, electric vehicles, and a power storage. In particular, recently, there has been a rapid increase in demand for a battery having high capacity, high output, and high energy density, which can be mounted on hybrid vehicles and electric vehicles.

Conventionally, various studies have been made on a lithium secondary battery containing nonaqueous electrolyte solution (also referred to as a nonaqueous electrolyte solution secondary battery and the like).

For example, Patent Document 1 discloses a nonaqueous electrolyte solution battery using lithium or a lithium alloy as a negative electrode active material and manganese dioxide as a positive electrode active material, which can suppress an increase in internal resistance occurring when a battery in which most of a discharge capacity is discharged is left for a long time and used again or when a battery is used for a long time at a low current of about several ρA as a power source for memory backup, and can obtain good battery performance, in which the nonaqueous electrolyte solution battery includes a negative electrode containing lithium or a lithium alloy, a positive electrode mainly composed of manganese dioxide, and a nonaqueous electrolyte solution, and the nonaqueous electrolyte solution contains lithium boron oxide in a ratio of from 0.01 mol/l to 0.5 mol/l.

Patent Document 2 discloses a nonaqueous electrolyte secondary battery which can improve a cycle characteristic by protecting a positive electrode active material from the action of hydrofluoric acid, in which the nonaqueous electrolyte secondary battery includes a nonaqueous electrolyte solution containing $LiPF_6$ as an electrolyte salt in a nonaqueous solvent, and the nonaqueous electrolyte solution contains lithium borate. Patent Document 2 discloses an example in which lithium manganate is used as the positive electrode active material.

Patent Document 3 discloses a nonaqueous electrolyte solution secondary battery which can maintain a high battery capacity even when used or stored in a high-temperature environment such as inside a car in summer, in which a lithium manganese composite oxide is used as a positive electrode active material, lithium, a lithium alloy, or a carbon material which reversibly absorbs and desorbs lithium is used as a negative electrode active material, and a nonaqueous electrolyte solution includes from 0.01 mol % to 2 mol % of lithium boron oxide.

Patent Document 1: Japanese Patent Application Laid-Open (JP-A) No. 2000-48828

Patent Document 2: Japanese Patent Application Laid-Open (JP-A) No. 2005-71617

Patent Document 3: Japanese Patent (JP-B) No. 4366724

SUMMARY OF INVENTION

Technical Problem

It may be required that for a battery using a nonaqueous electrolyte solution, initial battery resistance before storage of a battery is decreased, and also an increase in battery resistance due to storage is suppressed.

An object of the present disclosure is to provide a nonaqueous electrolyte solution for a battery which can decrease an initial battery resistance before storage of a battery and suppress an increase in battery resistance due to storage, and a lithium secondary battery using the nonaqueous electrolyte solution for a battery.

Solution to Problem

As the solutions to the above problems, the following aspects are included.

<1> A nonaqueous electrolyte solution for a battery, the solution including:

an additive A composed of a boron compound represented by the following Formula (1); and an additive B composed of a compound having a lower reductive decomposition potential than the additive A.

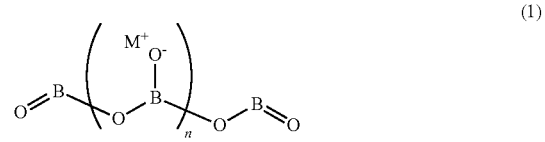

(1)

In Formula (1), n represents an integer from 1 to 5. $M^+$ represents an $Li^+$ ion or an $H^+$ ion, and when n is an integer from 2 to 5, more than one $M^+$ may be the same as or different from each other.

<2> The nonaqueous electrolyte solution for a battery according to <1>, wherein, when an absolute value of the reductive decomposition potential of the boron compound configuring the additive A is a reductive decomposition potential A, and an absolute value of the reductive decomposition potential of the compound configuring the additive B is a reductive decomposition potential B, a value obtained by subtracting the reductive decomposition potential B from the reductive decomposition potential A is from 0.1 V to 1.5 V.

<3> The nonaqueous electrolyte solution for a battery according to <1> or <2>, wherein, when an absolute value of the reductive decomposition potential of the compound configuring the additive B is a reductive decomposition potential B, the reductive decomposition potential B is from 0.5 V to 2.0 V.

<4> The nonaqueous electrolyte solution for a battery according to any one of <1> to <3>, wherein the additive B is at least one selected from the group consisting of a carbonate compound having a carbon-carbon unsaturated bond, a sultone compound, a cyclic sulfuric acid ester compound, a phosphoric acid ester compound, an oxalato compound, an aromatic compound substituted with a fluorine atom, an aliphatic compound substituted with a fluorine atom, a dinitrile compound, a sulfonyl compound having a fluorine atom, and a carbonate compound having a fluorine atom.

<5> The nonaqueous electrolyte solution for a battery according to any one of <1> to <4>, wherein the additive B is at least one selected from the group consisting of vinylene carbonate, vinyl ethylene carbonate, 1,3-propane sultone, 1,3-propene sultone, 4-methylsulfonyloxymethyl-2,2-dioxo-1,3,2-dioxathiolane, 4,4'-bis(2,2-dioxo-1,3,2-dioxathiolane), 4-propyl-2,2-dioxo-1,3,2-dioxathiolane, lithium difluorophosphate, tristrimethylsilyl phosphate, lithium difluorobis(oxalato) phosphate, lithium bis(oxalato) borate, orthofluorotoluene, (perfluorohexyl) ethylene, succinonitrile, adiponitrile, methanesulfonyl fluoride, lithium trifluoromethanesulfonate, lithium bis(fluorosulfonyl) imide, and 4-fluoroethylene carbonate.

<6> The nonaqueous electrolyte solution for a battery according to any one of <1> to <5>, wherein M⁺ in Formula (1) is an Li⁺ ion.

<7> The nonaqueous electrolyte solution for a battery according to any one of <1> to <6>, wherein a content of the additive A with respect to a total amount of the nonaqueous electrolyte solution for a battery is from 0.001% by mass to 10% by mass.

<8> The nonaqueous electrolyte solution for a battery according to any one of <1> to <7>, wherein a content of the additive B with respect to a total amount of the nonaqueous electrolyte solution for a battery is from 0.001% by mass to 10% by mass.

<9> The nonaqueous electrolyte solution for a battery according to any one of <1> to <8>, wherein a content mass ratio of the additive B to the additive A is from more than 1 to 20.

<10> A lithium secondary battery including:
a positive electrode;
a negative electrode containing at least one selected from the group consisting of a lithium metal, a lithium-containing alloy, a metal or an alloy which is capable of being alloyed with lithium, an oxide which is capable of being doped/undoped with lithium ions, a transition metal nitride which is capable of being doped/undoped with lithium ions, and a carbon material which is capable of being doped/undoped with lithium ions, as a negative electrode active material; and
the nonaqueous electrolyte solution for a battery according to any one of <1> to <9>.

<11> A lithium secondary battery obtained by charging and discharging the lithium secondary battery according to <10>.

Advantageous Effects of Invention

According to the disclosure, a nonaqueous electrolyte solution for a battery which can decrease an initial battery resistance before storage of a battery and suppress an increase in battery resistance due to storage, and a lithium secondary battery using the nonaqueous electrolyte solution for a battery, are provided.

DESCRIPTION OF EMBODIMENTS

Figure 1:
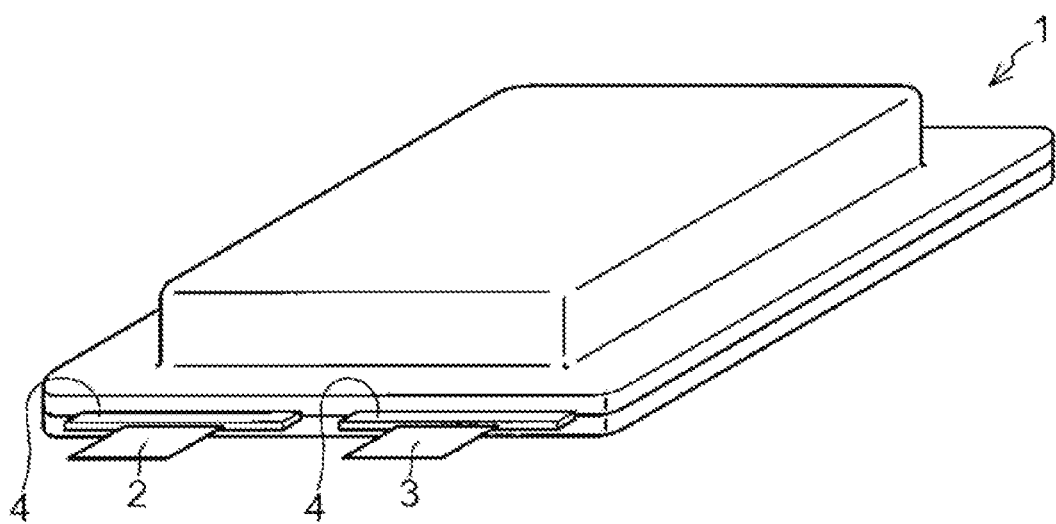
FIG. 1 is a schematic perspective view showing an example of a laminate type battery as an example of a lithium secondary battery of the disclosure.

In the present specification, a numerical range expressed using "to" means a range including numerical values described before and after "to" as a lower limit value and an upper limit value.

In the present specification, the amount of each component in the composition means, unless otherwise particularly stated, the total amount of the plurality of substances present in the composition, when there are the plurality of substances corresponding to each component in the composition.

[Nonaqueous Electrolyte Solution for Battery]

The nonaqueous electrolyte solution for a battery of the disclosure (hereinafter also simply referred to as a "nonaqueous electrolyte solution") includes an additive A composed of a boron compound represented by the following Formula (1), and an additive B composed of a compound having a lower reductive decomposition potential than the additive A.

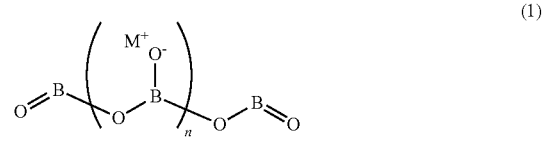

In Formula (1), n represents an integer from 1 to 5, M⁺ represents an Li⁺ ion or an H⁺ ion, and when n is an integer from 2 to 5, more than one M may be the same as or different from each other.

According to the nonaqueous electrolyte solution of the disclosure, an initial battery resistance before storage of a battery can be decreased, and an increase in battery resistance due to storage can be suppressed. The reason for this effect is not clear, but is presumed as follows.

An additive A (that is, a boron compound represented by Formula (1)) has a high reductive decomposition potential due to cyclic voltammetry (CV), and thus, is considered to be rapidly decomposed on a negative electrode during battery charging and discharging. As a result, it is considered that a low-resistance coated film is formed on the negative electrode by a decomposition product of Additive A. In addition to additive A, the nonaqueous electrolyte solution of the disclosure includes an additive B composed of a compound having a lower reductive decomposition potential than the additive A. Consequently, it is considered that at the time of charge and discharge of the battery, first, a coated film by a decomposition product of Additive A is rapidly formed on the negative electrode, and then, this coated film is reinforced by a decomposition product of additive B, thereby forming a coated film having low resistance and excellent durability. It is presumed that the coated film having low resistance and excellent durability formed on the negative electrode has the effect of decreasing the initial battery resistance and the effect of suppressing the increase in battery resistance due to storage.

For the nonaqueous electrolyte solution of the disclosure, the above Patent Document 1 (JP-A No. 2000-48828), the above Patent Document 2 (JP-A No. 2005-71617), and the above Patent Document 3 (JP-B No. 4366724) disclose a nonaqueous electrolyte solution including lithium tetraborate (Li₂B₄O₇) included in the range of additive A. In paragraphs 0018 to 0023 of Patent Document 1, paragraph 0005 of Patent Document 2, and paragraph 0012 of Patent Document 3, it is disclosed that lithium tetraborate included in the nonaqueous electrolyte solution suppresses elution of manganese ions from the positive electrode or precipitation of eluted manganese ions at the negative electrode, and the effect of the invention is achieved by the mechanism.

For the nonaqueous electrolyte solutions described in Patent Documents 1 to 3, it is considered that the nonaqueous electrolyte solution of the disclosure exhibits the effects of decreasing the initial battery resistance and suppressing the increase in battery resistance due to storage by a mechanism completely different from the mechanisms described in Patent Documents 1 to 3, with a combination of the additive A and the additive B.

In the present specification, the reductive decomposition potential of the additive means a value measured by the following method using cyclic voltammetry (CV).

First, a sample solution is prepared as follows.

As a nonaqueous solvent, ethylene carbonate (EC), dimethyl carbonate (DMC), and methyl ethyl carbonate (EMC) are mixed at a ratio of 34:33:33 (mass ratio), respectively, to obtain a mixed solvent. In the obtained mixed solvent, $LiPF_6$ as an electrolyte is dissolved such that the electrolyte concentration in a finally prepared sample solution is 1 mol/l. To the obtained solution, an additive as a measurement target of the reductive decomposition potential was added such that the additive concentration in the finally prepared sample solution is 0.5% by mass, thereby obtaining a sample solution.

Next, ALS electrochemical analyzer (BAS Inc.) as cyclic voltammetry (CV) is used to sweep the electrode potential from 3 V to 0 V at a sweep rate of 1 mV/sec, in the state that a graphite electrode as a working electrode (WE), a Li metal electrode as a counter electrode (CE), and a Li metal electrode as a reference electrode (RE) are immersed in the sample solution. During this time, the electrode potential when a current of 0.1 mA (that is, a current due to reductive decomposition of the additive) flows is defined as the reductive decomposition potential of the additive.

Hereinafter, the additive A and the additive B will be described.

<Additive A>

The nonaqueous electrolyte solution of the disclosure includes an additive A composed of a boron compound represented by the following Formula (1).

The additive A included in the nonaqueous electrolyte solution of the disclosure may be one or two or more kinds.

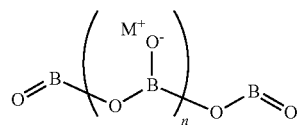

(1)

In Formula (1), n represents an integer from 1 to 5. $M^+$ represents an $Li^+$ ion or an $H^+$ ion, and when n is an integer from 2 to 5, more than one $M^+$ may be the same as or different from each other.

In Formula (1), n is preferably an integer from 1 to 3, and particularly preferably 2.

In Formula (1), $M^+$ is particularly preferably an $Li^+$ ion.

Examples of the boron compound represented by Formula (1) includes:

lithium triborate (reductive decomposition potential of 2.1 V, compound in which n is 1 and $M^+$ is an $Li^+$ ion), lithium tetraborate (reductive decomposition potential of 2.1 V, compound in which n is 2 and two $M^+$'s are $Li^+$ ions), lithium pentaborate (reductive decomposition potential of 2.2 V, compound in which n is 3 and three $M^+$'s are $Li^+$ ions), lithium hexaborate (reductive decomposition potential of 2.2 V, compound in which n is 4 and four $M^+$'s are $Li^+$ ions), and lithium heptaborate (reductive decomposition potential of 2.3 V, compound in which n is 5 and five $M^+$'s are $Li^+$ ions).

As the boron compound represented by Formula (1), a boron compound having a reductive decomposition potential in a range of from 2.0 V to 2.5 V is preferred.

The content of the additive A (the total content when there are two or more kinds) with respect to the total amount of the nonaqueous electrolyte solution of the disclosure is preferably from 0.001% by mass to 10% by mass, more preferably from 0.005% by mass % to 5% by mass, still preferably from 0.01% by mass to 1% by mass, and particularly preferably from 0.01% by mass to 0.5% by mass.

<Additive B>

The nonaqueous electrolyte solution of the disclosure includes an additive B composed of a compound having a lower reductive decomposition potential than the additive A.

The additive B may be any compound having a lower reductive decomposition potential than the additive A, and is not particularly limited. As long as additive B is a compound having a lower reductive decomposition potential than the additive A, the coated film formed by the decomposition product of the additive A which has been initially formed is reinforced by the decomposition product of the additive B, thereby forming a coated film having low resistance and excellent durability. As a result, effects of decreasing the initial battery resistance and suppressing an increase in battery resistance due to storage are achieved.

The additive B included in the nonaqueous electrolyte solution may be only one or two or more kinds.

When an absolute value of the reductive decomposition potential of the boron compound configuring the additive A is a reductive decomposition potential A, and an absolute value of the reductive decomposition potential of the compound configuring the additive B is a reductive decomposition potential B, a value obtained by subtracting the reductive decomposition potential B from the reductive decomposition potential A (that is, the reductive decomposition potential A–the reductive decomposition potential B) may be more than 0, and is preferably from 0.1 V to 1.5 V, more preferably from 0.2 V to 1.3 V, and particularly preferably from 0.3 V to 1.2 V.

The reductive decomposition potential B is preferably from 0.5 V to 2.0 V, and more preferably from 0.9 V to 1.8 V.

The additive B is more preferably at least one selected from the group consisting of a carbonate compound having a carbon-carbon unsaturated bond, a sultone compound, a cyclic sulfuric acid ester compound, a phosphoric acid ester compound, an oxalato compound, an aromatic compound substituted with a fluorine atom, an aliphatic compound substituted with a fluorine atom, a dinitrile compound, a sulfonyl compound having a fluorine atom, and a carbonate compound having a fluorine atom.

The additive B is preferably a compound having a molecular weight of 1000 or less, and more preferably a compound having a molecular weight of 500 or less.

(Carbonate Compound Having Carbon-Carbon Unsaturated Bond)

Examples of the carbonate compound having a carbon-carbon unsaturated bond include chain carbonates such as methyl vinyl carbonate, ethyl vinyl carbonate, divinyl carbonate, methyl propynyl carbonate, ethyl propynyl carbonate, dipropynyl carbonate, methyl phenyl carbonate, ethyl phenyl carbonate, and diphenyl carbonate; cyclic carbonates such as vinylene carbonate, methyl vinylene carbonate, 4,4-dimethyl vinylene carbonate, 4,5-dimethyl vinylene carbonate, vinyl ethylene carbonate, 4,4-divinyl ethylene carbonate, 4,5-divinyl ethylene carbonate, ethynyl ethylene carbonate, 4,4-diethynyl ethylene carbonate, 4,5-diethynyl ethylene carbonate, propynyl ethylene carbonate, 4,4-dipropynyl ethylene carbonate, and 4,5-dipropynyl ethylene carbonate. Among these compounds, methyl phenyl carbonate, ethyl phenyl carbonate, diphenyl carbonate, vinylene carbonate, vinyl ethylene carbonate, 4,4-divinyl ethylene carbonate, and 4,5-divinyl ethylene carbonate are preferred, and vinylene carbonate (reductive decomposition potential of 1.1 V) and vinyl ethylene carbonate (reductive decomposition potential of 1.0 V) are more preferred, and vinylene carbonate is particularly preferred.

(Sultone Compound)

Examples of the sultone compound include 1,3-propane sultone, 1,4-butane sultone, 1,3-propene sultone, 1-methyl-1,3-propene sultone, 2-methyl-1,3-propene sultone, and 3-methyl-1,3-propene sultone. Among these compounds, 1,3-propane sultone (reductive decomposition potential of 1.2 V) and 1,3-propene sultone (reductive decomposition potential of 1.4 V) are preferred, and 1,3-propene sultone (reductive decomposition potential of 1.4 V) is particularly preferred.

(Cyclic Sulfuric Acid Ester Compound)

Examples of the cyclic sulfuric acid ester compounds include:
catechol sulfate,
1,2-cyclohexyl sulfate,
2,2-dioxo-1,3,2-dioxathiolane,
4-methyl-2,2-dioxo-1,3,2-dioxathiolane,
4-ethyl-2,2-dioxo-1,3,2-dioxathiolane,
4-propyl-2,2-dioxo-1,3,2-dioxathiolane,
4-butyl-2,2-dioxo-1,3,2-dioxathiolane,
4-pentyl-2,2-dioxo-1,3,2-dioxathiolane,
4-hexyl-2,2-dioxo-1,3,2-dioxathiolane,
4-methylsulfonyloxymethyl-2,2-dioxo-1,3,2-dioxathiolane,
4-ethylsulfonyloxymethyl-2,2-dioxo-1,3,2-dioxathiolane,
bis((2,2-dioxo-1,3,2-dioxathiolan-4-yl) methyl) sulfate, and
4,4'-bis(2,2-dioxo-1,3,2-dioxathiolane).

Among these compounds, 4-methylsulfonyloxymethyl-2,2-dioxo-1,3,2-dioxathiolane (reductive decomposition potential of 1.3 V), 4,4'-bis(2,2-dioxo-1,3,2-dioxathiolane) (reductive decomposition potential of 1.2 V), and 4-propyl-2,2-dioxo-1,3,2-dioxathiolane (reductive decomposition potential of 1.4 V) are preferred, and 4,4'-bis(2,2-dioxo-1,3,2-dioxathiolane) (reductive decomposition potential of 1.2 V) is particularly preferred.

For the cyclic sulfuric acid ester compound, International Publication No. 2012/053644 may be referred to.

(Phosphoric Acid Ester Compound)

Examples of the phosphoric acid ester compound include lithium difluorophosphate, lithium monofluorophosphate, tristrimethylsilyl phosphate, dimethyltrimethylsilyl phosphate, methylditrimethylsilyl phosphate, trimethyl phosphate, tristriethylsilyl phosphate, triethyl phosphate, and trioctyl phosphate. Among these compounds, lithium difluorophosphate (reductive decomposition potential of 1.1 V) and tristrimethylsilyl phosphate (reductive decomposition potential of 0.9 V) are preferred.

The concept of the phosphoric acid ester compound herein does not include a phosphoric acid ester compound which is an oxalato compound described later. The phosphoric acid ester compound which is an oxalato compound is included in the concept of the oxalato compound.

(Oxalato Compound)

Examples of the oxalato compound include lithium difluorobis(oxalato) phosphate, lithium tetrafluoro(oxalato) phosphate, lithium tris(oxalato) phosphate, lithium difluoro (oxalato) borate, and lithium bis(oxalato) borate.

Among these compounds, lithium difluorobis(oxalato) phosphate (reductive decomposition potential of 2.0 V) and lithium bis(oxalato) borate (reductive decomposition potential of 1.8 V) are preferred.

(Aromatic Compound Substituted with Fluorine Atom)

The aromatic compound substituted with a fluorine atom is preferably benzene substituted with at least one fluorine atom. Here, the benzene substituted with at least one fluorine atom may be substituted with two or more fluorine atoms or may be substituted with a substituent other than a fluorine atom.

Examples of the aromatic compound substituted with a fluorine atom include orthofluorotoluene, metafluorotoluene, parafluorotoluene, difluorotoluene, trifluorotoluene, tetrafluorotoluene, pentafluorotoluene, fluorobenzene, orthodifluorobenzene, metadifluorobenzene, paradifluorobenzene, 1-fluoro-4-t-butylbenzene, 2-fluorobiphenyl, fluorocyclohexylbenzene (for example, 1-fluoro-2-cyclohexylbenzene, 1-fluoro-3-cyclohexylbenzene, 1-fluoro-4-cyclohexylbenzene), 2,4-difluoroanisole, 2,5-difluoroanisole, 2,6-difluoroanisole, and 3,5-difluoroanisole. Among these, orthofluorotoluene, metafluorotoluene, parafluorotoluene are preferred, and orthofluorotoluene (reductive decomposition potential of 1.5 V) is more preferred.

(Aliphatic Compound Substituted with Fluorine Atom)

The aliphatic compound substituted with a fluorine atom is preferably a fluorinated alkene. Here, the fluorinated alkene refers to an alkene substituted with at least one fluorine atom.

As the fluorinated alkene, a fluorinated alkene having from 3 to 15 carbon atoms is more preferred.

As the fluorinated alkene, ethylene substituted with a fluorinated alkyl group having from 1 to 12 carbon atoms is preferred. Here, the fluorinated alkyl group refers to an alkyl group substituted with at least one fluorine atom.

Examples of the fluorinated alkene include (perfluoromethyl) ethylene, (perfluoroethyl) ethylene, (perfluoropropyl) ethylene, (perfluorobutyl) ethylene, (perfluoropentyl) ethylene, (perfluorohexyl) ethylene, (perfluoroheptyl) ethylene, (perfluorooctyl) ethylene, (perfluorononyl) ethylene, (perfluorodecyl) ethylene, (perfluoroundecyl) ethylene, and (perfluorododecyl) ethylene.

Among these compounds, (perfluorohexyl) ethylene (reductive decomposition potential of 1.2 V) is preferred.

(Dinitrile Compound)

The dinitrile compound is preferably a dinitrile compound having from 2 to 10 carbon atoms.

Examples of the dinitrile compound include malononitrile, succinonitrile, glutaronitrile, adiponitrile, pimelonitnle, suberonitrile, azelanitrile, sebaconitrile, undecandinitrile, dodecandinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, trimethylsuccinonitrile, tetramethylsuccinonitrile, 3,3'-oxydipropionitrile, 3,3'-thiodipropionitrile, 3,3'-(ethylenedioxy)dipropionitrile, 3,3'-(ethylenedithio)dipropionitrile, 1,2-benzodinitrile, 1,3-benzodinitrile, 1, 4-benzodinitrile, 1,2-dicyanocyclobutane, 1,1-dicyanoethyl acetate, 2,3-dicyanohydroquinone, 4,5-dicyanoimidazole, 2,4-dicyano-3-methylglutamide, 9-dicyanomethylene-2,4,7-trinitrofluorene, and 2,6-dicyanotoluene.

Among these compounds, succinonitrile (reductive decomposition potential of 1.2 V) or adiponitrile (reductive decomposition potential of 1.2 V) is preferred.

(Sulfonyl Compound Having Fluorine Atom)

Examples of the sulfonyl compound having a fluorine atom include a sulfonyl fluoride compound, a lithium fluorinated alkyl sulfonate compound, and a bis(fluorosulfonyl) imide compound.

Examples of the sulfonyl fluoride compound include methanesulfonyl fluoride, ethanesulfonyl fluoride, propanesulfonyl fluoride, 2-propanesulfonyl fluoride, butanesulfonyl fluoride, 2-butanesulfonyl fluoride, hexanesulfonyl fluoride, trifluoromethanesulfonyl fluoride, perfluoroethanesulfonyl fluoride, perfluoropropanesulfonyl fluoride, perfluorobutanesulfonyl fluoride, ethenesulfonyl fluoride, 1-propene-1-sulfonyl fluoride, and 2-propene-1-sulfonyl fluoride.

Among these compounds, methanesulfonyl fluoride, ethanesulfonyl fluoride, propanesulfonyl fluoride, 2-propanesulfonyl fluoride, butanesulfonyl fluoride, 2-butanesulfonyl fluoride, hexanesulfonyl fluoride, trifluoromethanesulfonyl fluoride, perfluoroethanesulfonyl fluoride, perfluoropropanesulfonyl fluoride, or perfluorobutanesulfonyl fluoride is preferred, methanesulfonyl fluoride, ethanesulfonyl fluoride, propanesulfonyl fluoride, 2-propanesulfonyl fluoride, butanesulfonyl fluoride, 2-butanesulfonyl fluoride, or hexanesulfonyl fluoride is more preferred, methanesulfonyl fluoride, ethanesulfonyl fluoride, or propanesulfonyl fluoride is still more preferred, and methanesulfonyl fluoride (reductive decomposition potential of 1.3 V) is particularly preferred.

Examples of the lithium fluorinated alkyl sulfonate compound include lithium trifluoromethane sulfonate and lithium pentafluoroethane sulfonate. Among these compounds, lithium trifluoromethane sulfonate (reductive decomposition potential of 1.3 V) is preferred.

Examples of the bis(fluorosulfonyl) imide compound include lithium bis(fluorosulfonyl) imide. The compound has a reductive decomposition potential of 1.4 V.

(Carbonate Compound Having Fluorine Atom)

Examples of the carbonate compound having a fluorine atom include chain carbonates such as methyl trifluoromethyl carbonate, ethyl trifluoromethyl carbonate, bis(trifluoromethyl) carbonate, methyl(2,2,2-trifluoroethyl) carbonate, ethyl(2,2,2-trifluoroethyl) carbonate, bis(2,2,2-trifluoroethyl) carbonate; cyclic carbonates such as 4-fluoroethylene carbonate, 4,4-difluoroethylene carbonate, 4,5-difluoroethylene carbonate, and 4-trifluoromethylethylene carbonate. Among these compounds, 4-fluoroethylene carbonate (reductive decomposition potential of 1.3 V) is preferred.

The additive B is more preferably at least one selected from the group consisting of vinylene carbonate, vinyl ethylene carbonate, 1,3-propane sultone, 1,3-propene sultone, 4-methylsulfonyloxymethyl-2,2-dioxo-1,3,2-dioxathiolane, 4,4'-bis(2,2-dioxo-1,3,2-dioxathiolane), 4-propyl-2,2-dioxo-1,3,2-dioxathiolane, lithium difluorophosphate, tristrimethylsilyl phosphate, lithium difluorobis(oxalato) phosphate, lithium bis(oxalato) borate, orthofluorotoluene, (perfluorohexyl) ethylene, succinonitrile, adiponitrile, methanesulfonyl fluoride, lithium trifluoromethanesulfonate, lithium bis(fluorosulfonyl) imide, and 4-fluoroethylene carbonate, and particularly preferably at least one selected from the group consisting of vinylene carbonate, 1,3-propene sultone, 4,4'-bis(2,2-dioxo-1,3,2-dioxathiolane), lithium difluorophosphate, tristrimethylsilyl phosphate, and lithium bis(oxalato) borate.

The content of additive B (the total content when there are two or more kinds) with respect to the total amount of the nonaqueous electrolyte solution of the disclosure is preferably from 0.001% by mass to 10% by mass, more preferably from 0.05% by mass % to 5% by mass, still more preferably from 0.1% by mass to 4% by mass, further preferably from 0.1% by mass to 2% by mass, and particularly preferably from 0.1% by mass to 1% by mass.

In the nonaqueous electrolyte solution of the disclosure, a content mass ratio of the additive B to the additive A (that is, a ratio [a content mass of additive B/a content mass of additive A]) is preferably from more than 1 to 20, more preferably from 1.2 to 15, and particularly preferably from 1.4 to 10.

Next, other components of the nonaqueous electrolyte solution will be described. The nonaqueous electrolyte solution generally contains an electrolyte and a nonaqueous solvent.

(Nonaqueous Solvent)

A nonaqueous electrolyte solution generally contains a nonaqueous solvent.

As the nonaqueous solvent, various known solvents can be appropriately selected, but at least one selected from cyclic aprotic solvents and chain aprotic solvents is preferably used.

In order to improve the safety of the battery, when it is intended to improve the flash point of the solvent, it is preferred to use a cyclic aprotic solvent as the nonaqueous solvent.

(Cyclic Aprotic Solvent)

As the cyclic aprotic solvent, cyclic carbonate, cyclic carboxylic acid ester, cyclic sulfone, and cyclic ether can be used.

The cyclic aprotic solvent may be used singly, or in mixture of two or more kinds thereof.

The mixing ratio of the cyclic aprotic solvent in the nonaqueous solvent is from 10% by mass to 100% by mass, more preferably from 20% by mass to 90% by mass, and particularly preferably from 30% by mass to 80% by mass. With the ratio as such, the electroconductivity of the electrolyte solution relating to the charge and discharge characteristics of the battery can be increased.

Specific examples of the cyclic carbonate include ethylene carbonate, propylene carbonate, 1,2-butylene carbonate, 2,3-butylene carbonate, 1,2-pentylene carbonate, and 2,3-pentylene carbonate. Among these, ethylene carbonate and propylene carbonate having a high dielectric constant are preferably used. In the case of a battery using graphite as the negative electrode active material, ethylene carbonate is more preferred. These cyclic carbonates may be used in mixture of two or more kinds thereof.

Specific examples of the cyclic carboxylic acid ester include γ-butyrolactone, δ-valerolactone, or alkyl substituents such as methyl γ-butyrolactone, ethyl γ-butyrolactone, and ethyl δ-valerolactone.

The cyclic carboxylic acid ester has a low vapor pressure, a low viscosity, and a high dielectric constant, and can lower the viscosity of the electrolyte solution without lowering the flash point of the electrolyte solution and the dissociation degree of the electrolyte. Thus, since the cyclic carboxylic acid ester has the characteristics of improving the conductivity of the electrolyte solution, which is an indicator related to the discharge characteristic of the battery, without increasing the flammability of the electrolyte solution, it is preferred to use the cyclic carboxylic acid ester as the cyclic aprotic solvent, when it is intended to improve the flash point of the solvent. γ-Butyrolactone is most preferred.

It is preferred that the cyclic carboxylic acid ester is used by being mixed with another cyclic aprotic solvent. Examples thereof include a mixture of the cyclic carboxylic acid ester with a cyclic carbonate and/or a chain carbonate.

Specific examples of combinations of the cyclic carboxylic acid esters with a cyclic carbonate and/or a chain carbonate include γ-butyrolactone and ethylene carbonate; γ-butyrolactone, ethylene carbonate, and dimethyl carbonate; γ-butyrolactone, ethylene carbonate, and methyl ethyl carbonate; γ-butyrolactone, ethylene carbonate, and diethyl carbonate; γ-butyrolactone and propylene carbonate; γ-butyrolactone, propylene carbonate, and dimethyl carbonate; γ-butyrolactone, propylene carbonate, and methyl ethyl carbonate; γ-butyrolactone, propylene carbonate, and diethyl carbonate; γ-butyrolactone, ethylene carbonate, and propylene carbonate; γ-butyrolactone, ethylene carbonate, propylene carbonate, and dimethyl carbonate; γ-butyrolactone, ethylene carbonate, propylene carbonate, and methyl ethyl carbonate; γ-butyrolactone, ethylene carbonate, propylene carbonate, and diethyl carbonate; γ-butyrolactone, ethylene carbonate, dimethyl carbonate, and methyl ethyl carbonate; γ-butyrolactone, ethylene carbonate, dimethyl carbonate, and diethyl carbonate; γ-butyrolactone, ethylene carbonate, methyl ethyl carbonate, and diethyl carbonate; γ-butyrolactone, ethylene carbonate, dimethyl carbonate, and methyl ethyl carbonate, and diethyl carbonate; γ-butyrolactone, ethylene carbonate, propylene carbonate, dimethyl carbonate, and methyl ethyl carbonate; γ-butyrolactone, ethylene carbonate, propylene carbonate, dimethyl carbonate, and diethyl carbonate; γ-butyrolactone, ethylene carbonate, propylene carbonate, methyl ethyl carbonate, and diethyl carbonate γ-butyrolactone, ethylene carbonate, propylene carbonate, dimethyl carbonate, methyl ethyl carbonate, and diethyl carbonate; γ-butyrolactone and sulfolane; γ-butyrolactone, ethylene carbonate and sulfolane; γ-butyrolactone, propylene carbonate, and sulfolane; γ-butyrolactone, ethylene carbonate, propylene carbonate, and sulfolane; and γ-butyrolactone, sulfolane, and dimethyl carbonate.

Examples of the cyclic sulfone include sulfolane, 2-methylsulfolane, 3-methylsulfolane, dimethyl sulfone, diethyl sulfone, dipropyl sulfone, methylethyl sulfone, and methylpropyl sulfone.

Examples of the cyclic ether include dioxolane.

(Chain Aprotic Solvent)

As the chain aprotic solvent, a chain carbonate, a chain carboxylic acid ester, a chain ether, a chain phosphoric acid ester, and the like, can be used.

The mixing ratio of the chain aprotic solvent in the nonaqueous solvent is from 10% by mass to 100% by mass, more preferably from 20% by mass to 90% by mass, and particularly preferably from 30% by mass to 80% by mass.

Specific examples of the chain carbonate include dimethyl carbonate, methyl ethyl carbonate, diethyl carbonate, methyl propyl carbonate, methyl isopropyl carbonate, ethyl propyl carbonate, dipropyl carbonate, methyl butyl carbonate, ethyl butyl carbonate, dibutyl carbonate, methyl pentyl carbonate, ethyl pentyl carbonate, dipentyl carbonate, methyl heptyl carbonate, ethyl heptyl carbonate, diheptyl carbonate, methyl hexyl carbonate, ethyl hexyl carbonate, dihexyl carbonate, methyl octyl carbonate, ethyl octyl carbonate, dioctyl carbonate, and methyltrifluoroethyl carbonate. These chain carbonates may be used in mixture of two or more kinds thereof.

Specific examples of the chain carboxylic acid ester include methyl pivalate.

Specific examples of the chain ether include dimethoxyethane.

Specific examples of the chain phosphoric acid ester include trimethyl phosphate.

(Combination of Solvents)

The nonaqueous solvent contained in the nonaqueous electrolyte solution of the disclosure may be only one or two or more kinds.

Only one or more kinds of cyclic aprotic solvents, only one or more kinds of chain aprotic solvents, or a mixture of a cyclic aprotic solvent and a chain protic solvent, may be used. When it is particularly intended to improve the load characteristics and low temperature characteristics of the battery, it is preferred to use a combination of a cyclic aprotic solvent and a chain aprotic solvent as the nonaqueous solvent.

Furthermore, in view of the electrochemical stability of the electrolyte solution, it is most preferred to apply a cyclic carbonate to the cyclic aprotic solvent and a chain carbonate to the chain aprotic solvent. The conductivity of the electrolyte solution related to the charge and discharge characteristics of the battery can be increased by a combination of a cyclic carboxylic acid ester and a cyclic carbonate and/or a chain carbonate.

Specific examples of the combination of a cyclic carbonate and a chain carbonate include ethylene carbonate and dimethyl carbonate; ethylene carbonate and methyl ethyl carbonate; ethylene carbonate and diethyl carbonate; propylene carbonate and dimethyl carbonate; propylene carbonate and methyl ethyl carbonate; propylene carbonate and diethyl carbonate; ethylene carbonate, propylene carbonate, and methyl ethyl carbonate; ethylene carbonate, propylene carbonate, and diethyl carbonate; ethylene carbonate, dimethyl carbonate, and methyl ethyl carbonate; ethylene carbonate, dimethyl carbonate, and diethyl carbonate; ethylene carbonate, methyl ethyl carbonate, and diethyl carbonate; ethylene carbonate, dimethyl carbonate, methyl ethyl carbonate, and diethyl carbonate; ethylene carbonate, propylene carbonate, dimethyl carbonate, and methyl ethyl carbonate; ethylene carbonate, propylene carbonate, dimethyl carbonate, and diethyl carbonate; ethylene carbonate, propylene carbonate, methyl ethyl carbonate, and diethyl carbonate; and ethylene carbonate, propylene carbonate, dimethyl carbonate, methyl ethyl carbonate, and diethyl carbonate.

The mixing ratio of the cyclic carbonate and the chain carbonate is expressed as a mass ratio, and cyclic carbonate: chain carbonate is from 5:95 to 80:20, more preferably from 10:90 to 70:30, and particularly preferably from 15:85 to 55:45. Since the ratio as such can suppress an increase in viscosity of the electrolyte solution and increase the dissociation degree of electrolyte, the conductivity of the electrolyte solution related to the charge and discharge characteristics of a battery can be increased. The solubility of the electrolyte can be further increased. Therefore, since the electrolyte solution can have excellent electrical conductivity at normal temperature or low temperature, the load characteristics of the battery from normal temperature to a low temperature can be improved.

(Other Solvents)

Examples of the nonaqueous solvent include solvents other than those described above.

Specific examples of other solvents include amides such as dimethylformamide, chain carbamates such as methyl-N, N-dimethylcarbamate, cyclic amides such as N-methylpyrrolidone, cyclic ureas such as N,N-dimethylimidazolidinone, boron compounds such as trimethyl borate, triethyl borate, tributyl borate, trioctyl borate, and trimethylsilyl borate, and polyethylene glycol derivatives represented by the following general formula:

$$HO(CH_2CH_2O)_aH$$

$$HO[CH_2CH(CH_3)O]_bH$$

$$CH_3O(CH_2CH_2O)_cH$$

$$CH_3O[CH_2CH(CH_3)O]_dH$$

$$CH_3O(CH_2CH_2O)_eCH_3$$

$$CH_3O[CH_2CH(CH_3)O]_fCH_3$$

$$C_9H_{19}PhO(CH_2CH_2O)_g[CH(CH_3)O]_hCH_3$$

(Ph is a phenyl group)

$$CH_3O[CH_2CH(CH_3)O]_iCO[OCH(CH_3)CH_2]_jOCH_3$$

where a to f are integers from 5 to 250, g to j are integers from 2 to 249, $5 \leq g+h \leq 250$, and $5 \leq i+j \leq 250$.

(Electrolyte)

For the nonaqueous electrolyte solution of the disclosure, various known electrolytes can be used, and any one can be used as long as it is usually used as an electrolyte for a nonaqueous electrolyte solution.

Specific examples of the electrolyte include a tetraalkylammonium salt such as $(C_2H_5)_4NPF_6$, $(C_2H_5)_4NBF_4$, $(C_2H_5)_4NClO_4$, $(C_2H_5)_4NAsF_6$, $(C_2H_5)_4N_2SiF_6$, $(C_2H_5)_4NOSO_2C_kF_{(2k+1)}$ (k=an integer from 1 to 8), and $(C_2H_5)_4NPF_n[C_kF_{(2k+1)}]_{(6-n)}$ (n=from 1 to 5, k=an integer from 1 to 8), and a lithium salt such as $LiPF_6$, $LiBF_4$, $LiClO_4$, $LiAsF_6$, $Li_2SiF_6$, $LiOSO_2C_kF_{(2k+1)}$ (k=an integer from 1 to 8), and $LiPF_n[C_kF_{(2k+1)}]_{(6-n)}$ (n=from 1 to 5, k=an integer from 1 to 8). The lithium salt represented by the following general formula can also be used.

$LiC(SO_2R^7)(SO_2R^8)(SO_2R^9)$, $LiN(SO_2OR^{10})(SO_2OR^{11})$, $LiN(SO_2R^{12})(SO_2R^{13})$ (where $R^7$ to $R^{13}$ may be the same as or different from each other and are a perfluoroalkyl group having from 1 to 8 carbon atoms) These electrolytes may be used singly, or in mixture of two or more kinds thereof.

Among these, a lithium salt is particularly desirable, and further, $LiPF_6$, $LiBF_4$, $LiOSO_2C_kF_{(2k+1)}$ (k=an integer from 1 to 8), $LiClO_4$, $LiAsF_6$, $LiNSO_2[C_kF_{(2k+1)}]_2$ (k=an integer from 1 to 8), $LiPF_n[C_kF_{(2k+1)}]_{(6-n)}$ (n=from 1 to 5, k=an integer from 1 to 8) are preferred.

The electrolyte is usually contained in the nonaqueous electrolyte solution at a concentration of from 0.1 mol/L to 3 mol/L, and preferably from 0.5 mol/L to 2 moL.

In the nonaqueous electrolyte solution of the disclosure, when a cyclic carboxylic acid ester such as γ-butyrolactone is used in combination as the nonaqueous solvent, it is particularly desirable to contain $LiPF_6$. Since $LiPF_6$ has a high dissociation degree, the conductivity of the electrolyte solution can be increased, and the reductive decomposition reaction of the electrolyte solution on the negative electrode can be suppressed. $LiPF_6$ may be used singly, or $LiPF_6$ and other electrolytes may be used. Any other electrolyte can be used as long as it is usually used as an electrolyte for a nonaqueous electrolyte solution, but lithium salts other than $LiPF_6$ are preferred among the specific examples of the lithium salt described above.

Specific examples include $LiPF_6$ and $LiBF_4$, $LiPF_6$ and $LiN[SO_2C_kF_{(2k+1)}]_2$ (k=an integer from 1 to 8), $LiPF_6$, $LiBF_4$, and $LiN[SO_2C_kF_{(2k+1)}]$ (k=an integer from 1 to 8).

The ratio of $LiPF_6$ in the lithium salt is preferably from 1% by mass to 100% by mass, more preferably from 10% by mass to 100% by mass, and still more preferably from 50% by mass to 100% by mass. Such an electrolyte is contained in the nonaqueous electrolyte solution at a concentration of from 0.1 mol/L to 3 mol/L, preferably from 0.5 mol/L to 2 mol/L.

The nonaqueous electrolyte of the disclosure is not only suitable as the nonaqueous electrolyte solution for a lithium secondary battery, but also usable as a nonaqueous electrolyte solution for a primary battery, a nonaqueous electrolyte solution for an electrochemical capacitor, and an electrolyte solution for an electric double layer capacitor and an aluminum electrolytic capacitor.

[Lithium Secondary Battery]

A lithium secondary battery of the disclosure includes a positive electrode, a negative electrode and a nonaqueous electrolyte solution of the disclosure.

<Negative Electrode>

The lithium secondary battery of the disclosure includes a negative electrode.

The negative electrode may contain a negative electrode active material and a negative electrode current collector.

In the negative electrode active material in the negative electrode, at least one selected from the group consisting of metal lithium, lithium-containing alloys, metals or alloys which can be alloyed with lithium, oxides which can be doped/undoped with lithium ions, transition metal nitrides which can be doped/undoped with lithium ions, and carbon materials which can be doped/undoped with lithium ions (which may be used singly, or in mixture of two or more kinds thereof), can be used.

Examples of a metal or alloy which can be alloyed with lithium (or lithium ions) include silicon, silicon alloys, tin, and tin alloys. Further, lithium titanate may be used.

Among these, carbon materials which can be doped/undoped with lithium ions are preferred. Examples of the carbon material include carbon black, activated carbon, graphite material (artificial graphite or natural graphite), and amorphous carbon materials. The shape of the carbon material may be any of a fibrous shape, a spherical shape, a potato shape, and a flake shape.

Specific examples of the amorphous carbon material include hard carbon, coke, mesocarbon microbeads (MCMB) baked to 1500° C. or less, and mesophase pitch carbon fiber (MCF).

Examples of the graphite material include natural graphite and artificial graphite. As the artificial graphite, graphitized MCMB, graphitized MCF, and the like are used. As the graphite material, a graphite material containing boron can be used. As the graphite material, those coated with a metal such as gold, platinum, silver, copper and tin, those coated with amorphous carbon, and those obtained by mixing amorphous carbon and graphite, can be used.

These carbon materials may be used singly, or in mixture of two or more kinds thereof.

The carbon material is particularly preferably a carbon material having a (002) plane spacing d (002) of 0.340 nm or less as measured by X-ray analysis. The carbon material is also preferably graphite having a true density of 1.70 g/cm³ or more or a highly crystalline carbon material having properties close thereto. When the carbon material as described above is used, energy density of the battery can be further increased.

There is no particular limitation on the material of the negative electrode current collector in a negative electrode, and a well-known material can be optionally used.

Specific examples of the negative electrode current collector include metal materials such as copper, nickel, stainless steel, and nickel-plated steel. Among these, copper is particularly preferred, from the viewpoint of ease of processing.

<Positive Electrode>

The positive electrode may contain a positive electrode active material and a positive electrode current collector.

Examples of the positive electrode active material in the positive electrode include transition metal oxides or transition metal sulfides such as $MoS_2$, $TiS_2$, $MnO_2$, and $V_2O_5$, composite oxides composed of lithium and a transition metal such as $LiCoO_2$, $LiMnO_2$, $LiMn_2O_4$, $LiNiO_2$, $LiNi_xCo_{(1-X)}O_2$ [0<X<1], $Li_{1+\alpha}Me_{1-\alpha}O_2$ having an $\alpha$-$NaFeO_2$ type crystal structure (Me is a transition metal element including Mn, Ni and Co, $1.0 \leq (1+\alpha)/(1-\alpha) \leq 1.6$), $LiNi_xCo_yMn_zO_2$ [x+y+z=1, 0<x<1, 0<y<1, 0<z<1 (for example, $LiNi_{0.33}Co_{0.33}Mn_{0.33}O_2$, $LiNi_{0.5}Co_{0.2}Mn_{0.3}O_2$, etc.), $LiFeP_4$, and $LiMnPO_4$, and conductive polymer materials such as polyaniline, polythiophene, polypyrrole, polyacetylene, polyacene, dimercaptothiadiazole, and polyaniline composites. Among these, a composite oxide composed of lithium and a transition metal is particularly preferred. When the negative electrode is lithium metal or a lithium alloy, a carbon material can be used as the positive electrode. A mixture of a composite oxide of lithium and a transition metal and a carbon material can be used as the positive electrode.

The positive electrode active material may be used singly, or in mixture of two or more kinds thereof. When the positive electrode active material has insufficient conductivity, it can be used together with a conductive auxiliary agent to constitute a positive electrode. Examples of the conductive auxiliary agent include carbon materials such as carbon black, amorphous whiskers, and graphite.

There is no particular limitation on the material of the positive electrode current collector in a positive electrode, and a well-known material can be optionally used.

Specific examples of the positive electrode current collector include metal materials such as aluminum, an aluminum alloy, stainless steel, nickel, titanium, and tantalum; and carbon materials such as carbon cloth and carbon paper.

<Separator>

It is preferred that the lithium secondary battery of the disclosure includes a separator between the negative electrode and the positive electrode.

The separator is a film which electrically insulates the positive electrode and the negative electrode and permeates lithium ions, and examples thereof include a porous film and a polymer electrolyte.

As the porous film, a microporous polymer film is preferably used, and examples of the material include polyolefin, polyimide, polyvinylidene fluoride, and polyester.

In particular, porous polyolefin is preferred, and specific examples thereof include a porous polyethylene film, a porous polypropylene film, or a multilayer film of a porous polyethylene film and a polypropylene film. On the porous polyolefin film, other resins having excellent thermal stability may be coated.

Examples of the polymer electrolyte include a polymer in which a lithium salt is dissolved and a polymer swollen with an electrolyte solution.

The nonaqueous electrolyte solution of the disclosure may be used for the purpose of obtaining a polymer electrolyte by swelling a polymer.

<Battery Configuration>

The lithium secondary battery of the disclosure can take various known shapes, and can be formed into a cylindrical type, a coin type, a square type, a laminate type, a film type, or any other shape. However, the basic structure of the battery is the same regardless of the shape, and the design can be changed according to the purpose.

Examples of the lithium secondary battery of the disclosure include a laminate type battery.

Figure 2:
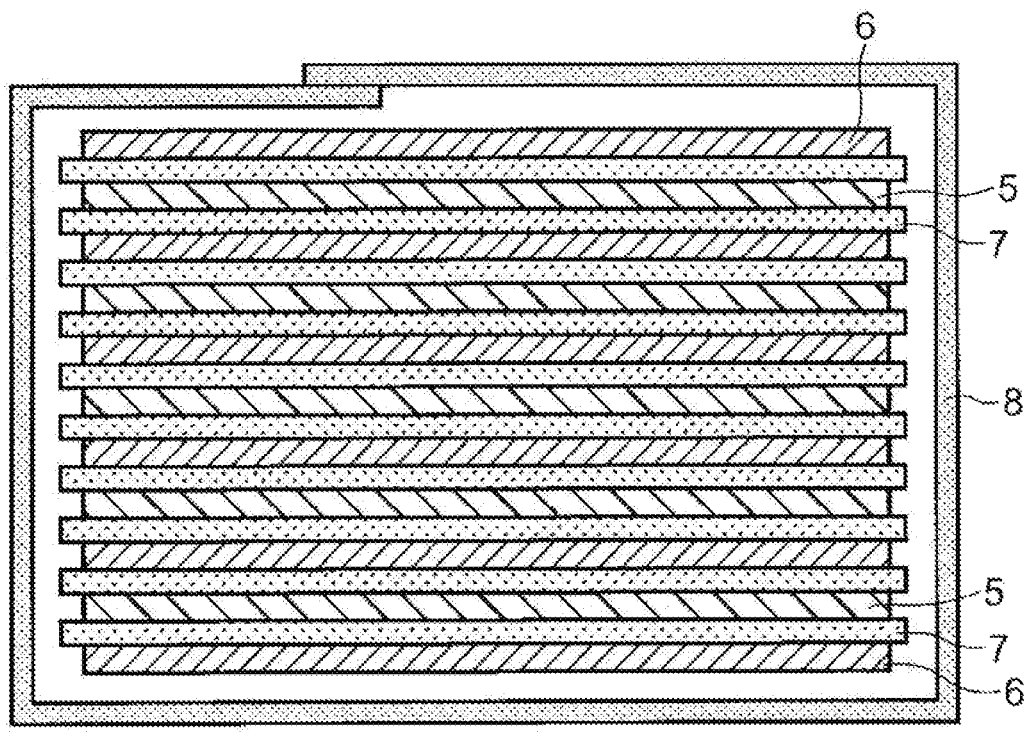
FIG. 2 is a schematic cross-sectional view of a stacked electrode body accommodated in the laminate type battery shown in FIG. 1 in the thickness direction.

FIG. 1 is a schematic perspective view showing an example of a laminate type battery which is an example of the lithium secondary battery of the disclosure, and FIG. 2 is a schematic cross-sectional view of the stacked electrode body accommodated in the laminate type battery shown in FIG. 1 in the thickness direction.

The laminate type battery shown in FIG. 1 includes a nonaqueous electrolyte solution (not shown in FIG. 1) and a stacked electrode body (not shown in FIG. 1) inside, and also the periphery is sealed, so that the laminate outer package 1 with the inside being sealed is provided. As the laminate exterior body 1, for example, an aluminum laminate outer package is used.

As shown in FIG. 2, the stacked electrode body accommodated in the laminate outer package 1 includes a laminate in which positive electrode plates 5 and negative electrode plates 6 are alternately laminated with separators 7 interposed therebetween, and a separator 8 surrounding the periphery of the laminate. The positive electrode plate 5, the negative electrode plate 6, the separator 7, and the separator 8 are impregnated with the nonaqueous electrolyte solution of the disclosure.

The plurality of positive electrode plates 5 in the stacked electrode body are all electrically connected to the positive electrode terminal 2 via the positive electrode tab (not shown), and a part of the positive electrode terminal 2 protrudes outward from the peripheral end portion of the laminate outer package 1 (FIG. 1). A portion where the positive electrode terminal 2 protrudes in the peripheral end portion of the laminate outer package 1 is sealed with an insulating seal 4.

Similarly, the plurality of negative electrode plates 6 in the stacked electrode body are all electrically connected to the negative electrode terminal 3 via the negative electrode tab (not shown), and a part of the negative electrode terminal 3 protrudes outward from the peripheral end portion of the laminate outer package 1 (FIG. 1). A portion where the negative electrode terminal 3 protrudes in the peripheral end portion of the laminate outer package 1 is sealed with an insulating seal 4.

In the laminate type battery according to the above example, the number of the positive electrode plates 5 is 5, the number of the negative electrode plates 6 is 6, and the positive electrode plates 5 and the negative electrode plates 6 are laminated with a separator 7 interposed therebetween, so that the outermost layers of both sides are the negative electrode plates 6. However, it is needless to say that in the laminate type battery, the number of positive electrode plates, the number of negative electrode plates, and the arrangement thereof are not limited to this example, and various changes may be made.

Another examples of the lithium secondary battery of the disclosure include a coin type battery.

Figure 3:
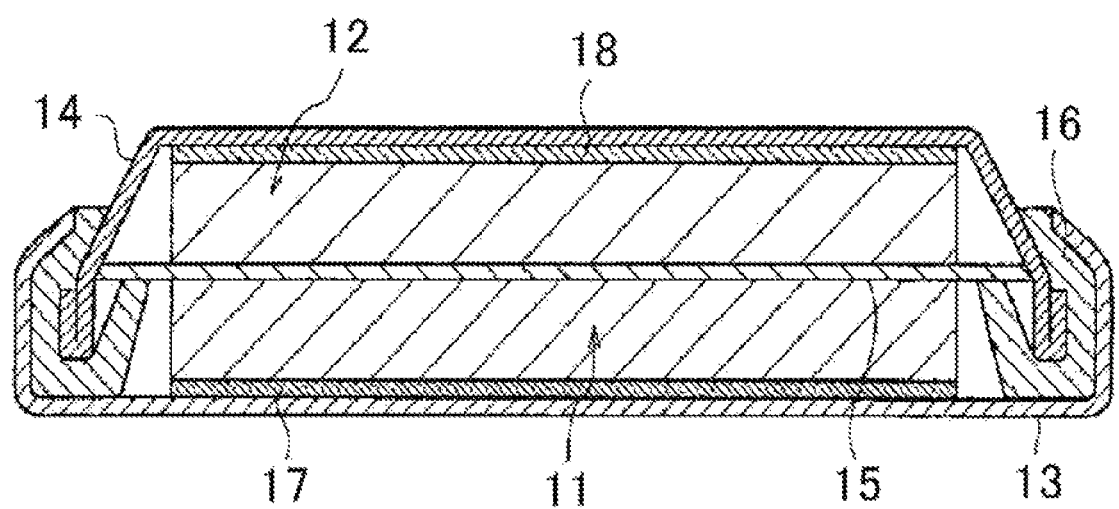
FIG. 3 is a schematic cross-sectional view showing an example of a coin type battery, which is another example of the lithium secondary battery of the disclosure.

FIG. 3 is a schematic perspective view showing an example of a coin type battery which is another example of the lithium secondary battery of the disclosure.

In the coin type battery shown in FIG. 3, a disc-shaped negative electrode 12, a separator 15 to which the nonaqueous electrolyte solution is injected, a disc-shaped positive electrode 11, and if necessary, spacer plates 17 and 18 made of for example, stainless steel or aluminum are accommodated between a positive electrode can 13 (hereinafter also referred to as "a battery can") and a sealing plate 14 (hereinafter also referred to as "a battery can lid"), in a state of being laminated in this order. The positive electrode can 13 and the sealing plate 14 are caulked and sealed via a gasket 16.

In this example, the nonaqueous electrolyte solution of the disclosure is used as the nonaqueous electrolyte solution injected to the separator 15.

The lithium secondary battery of the disclosure may be a lithium secondary battery obtained by charging and discharging a lithium secondary battery (lithium secondary battery before charging and discharging) including a negative electrode, a positive electrode, and the nonaqueous electrolyte solution of the disclosure.

That is, a lithium secondary battery of the disclosure may be a lithium secondary battery (charged and discharged lithium secondary battery) produced by first, producing a lithium secondary battery before charging and discharging including a negative electrode, a positive electrode, and the nonaqueous electrolyte solution of the disclosure, and then, charging and discharging the lithium secondary battery before charging and discharging one or more times.

The use of the lithium secondary battery of the disclosure is not particularly limited, and can be used for various known uses. For example, the lithium secondary battery can be widely used, from small portable devices such as notebook PCs, mobile PCs, mobile phones, headphone stereos, video movies, LCD TVs, hand-held cleaners, electronic notebooks, calculators, radios, backup power applications, motors, automobiles, electric cars, motorcycles, electric bikes, bicycles, electric motors bicycles, lighting fixtures, game machines, watches, electric tools, and cameras to large devices.

EXAMPLES

Hereinafter, examples of the disclosure will be described below, but the disclosure is not limited to the following examples.

In the following examples, an "addition amount" represents the content in the finally obtained nonaqueous electrolyte solution (that is, the amount with respect to the total amount of the finally obtained nonaqueous electrolyte solution).

"wt %" means % by mass.

Example 1

A coin type lithium secondary battery (hereinafter also referred to as a "coin type battery") having the configuration shown in FIG. 3 was produced by the following procedure.
<Production of Negative Electrode>
A paste-like negative electrode mixture slurry was prepared by kneading 97 parts by mass of natural graphite-based graphite, carboxymethyl cellulose (1 part by mass), and SBR latex (2 parts by mass) with an aqueous solvent.

Next, the negative electrode mixture slurry was applied to a negative electrode current collector made of a strip-shaped copper foil having a thickness of 18 μm, dried, and then compressed by a roll press to obtain a sheet-like negative electrode including a negative electrode current collector and a negative electrode active material layer. The coating density of the negative electrode active material layer in this case was 10 mg/cm², and the packing density thereof was 1.5 g/ml.

<Production of Positive Electrode>
$LiCoO_2$ (90 parts by mass), acetylene black (5 parts by mass), and polyvinylidene fluoride (5 parts by mass), were kneaded using N-methylpyrrolidinone as a solvent to prepare a paste-like positive electrode mixture slurry.

Next, the positive electrode mixture slurry was applied to a positive electrode current collector of a strip-shaped aluminum foil having a thickness of 20 μm, dried, and then compressed by a roll press to obtain a sheet-like positive electrode including a positive electrode current collector and a positive electrode active material. The coating density of the positive electrode active material layer in this case was 30 mg/cm², and the packing density thereof was 2.5 g/ml.

<Preparation of Nonaqueous Electrolyte Solution>
As a nonaqueous solvent, ethylene carbonate (EC), dimethyl carbonate (DMC), and methyl ethyl carbonate (EMC) were mixed at a ratio of 34:33:33 (mass ratio), respectively, to obtain a mixed solvent.

In the obtained mixed solvent, $LiPF_6$ as an electrolyte was dissolved such that the electrolyte concentration in the finally prepared nonaqueous electrolyte solution was 1 mol/l.

To the resulting solution, as additive A, lithium tetraborate (that is, a compound of Formula (1), where n is 2 and two $M^+$'s are both a $Li^+$ ion) was added such that the content was 0.1% by mass with respect to the total mass of the finally prepared nonaqueous electrolyte solution (that is, added at an addition amount of 0.1% by mass), and as additive B, 4,4'-bis(2,2-dioxo-1,3,2-dioxathiolane) (hereinafter also referred to as "cyclic sulfuric acid ester (1)") was added such that the content with respect to the finally prepared nonaqueous electrolyte solution was 0.5% by mass (that is, added at an addition amount of 0.5% by mass), so as to obtain a nonaqueous electrolyte solution.

<Production of Coin Type Battery>
The negative electrode described above was punched into a disk shape having a diameter of 14 mm and the positive electrode was punched into a disk shape having a diameter of 13 mm, thereby obtaining a coin-shaped negative electrode and a coin-shaped positive electrode, respectively. A microporous polyethylene film having a thickness of 20 μm was punched into a disk shape having a diameter of 17 mm to obtain a separator.

The obtained coin-shaped negative electrode, separator, and coin-shaped positive electrode were laminated in a stainless steel battery can (2032 size) in this order, and then 20 μl of the nonaqueous electrolyte solution was injected into the battery can and impregnated into the separator, the positive electrode, and the negative electrode.

Next, an aluminum plate (thickness of 1.2 mm, diameter of 16 mm) and a spring were placed on the positive electrode, and the battery was sealed by caulking the battery can lid, via a polypropylene gasket.

Thus, a coin type battery (that is, a coin type lithium secondary battery) having the configuration shown in FIG. 3 having a diameter of 20 mm and a height of 3.2 mm was obtained.

<Evaluation>
The following evaluation was performed on the obtained coin type battery.

(Initial Battery Resistance (25° C.))

The coin type battery obtained above was charged and discharged three times at a constant voltage of 4.2 V, and then charged to a constant voltage of 3.9 V. The coin type battery after charging was kept at 25° C. in a thermostatic bath, discharged at a constant current of 0.2 mA at 25° C., and a potential drop in the coin type battery was measured for 10 seconds after the start of discharge, thereby measuring a DC resistance [Ω] at 25° C. of the coin type battery. The obtained value was defined as the initial battery resistance (25° C.).

For the coin type battery of Comparative Example 1 described later also, the initial battery resistance (25° C.) was measured in the same manner.

Table 1 shows the initial battery resistance (25° C.) of Example 1 as a relative value to the case in which the initial battery resistance (25° C.) of Comparative Example 1 is 100.

(Initial Battery Resistance (−20° C.))

The coin type battery obtained above was charged and discharged three times at a constant voltage of 4.2 V, and then charged to a constant voltage of 3.9 V. The coin type battery after charging was kept at −20° C. in a thermostatic bath, discharged at a constant current of 0.2 mA at −20° C., and a potential drop in the coin type battery was measured for 10 seconds after the start of discharge, thereby measuring a DC resistance [Ω] at −20° C. of the coin type battery. The obtained value was defined as the initial battery resistance (−20° C.).

For the coin type battery of Comparative Example 1 described later also, the initial battery resistance (−20° C.) was measured in the same manner.

Table 1 shows the initial battery resistance (−20° C.) of Example 1 as a relative value to the case in which the initial battery resistance (−20° C.) of Comparative Example 1 is 100.

In Tables 1 to 3, the cyclic sulfuric acid ester (1) represents 4,4'-bis(2,2-dioxo-1,3,2-dioxathiolane) as a cyclic sulfuric acid ester compound.

Tables 1 to 9 also show the reductive decomposition potential of each additive.

Comparative Example 1

Operation was performed in the same manner as in Example 1, except that additive A was not used.

The results are shown in Table 1.

TABLE 1

| | Additive A | | | Additive B | | | initial battery resistance (relative value) | |
|---|---|---|---|---|---|---|---|---|
| | Kind | Reductive decomposition potential (V) | Addition amount (wt %) | Kind | Reductive decomposition potential (V) | Addition amount (wt %) | 25° C. | −20° C. |
| Comparative Example 1 | None | — | — | Cyclic sulfuric acid ester (1) | 1.2 | 0.5 | 100 | 100 |
| Example 1 | Lithium tetraborate | 2.1 | 0.1 | Cyclic sulfuric acid ester (1) | 1.2 | 0.5 | 83 | 72 |

As shown in Table 1, in Example 1 in which a nonaqueous electrolyte solution containing additive A and additive B is used, the initial battery resistance was decreased, as compared with Comparative Example 1 in which a nonaqueous electrolyte solution containing additive B and not containing additive A was used.

Example 2 and Comparative Example 2

Evaluation was performed in the same manner as in each of Example 1 and Comparative Example 1, except that the addition amount of additive B was changed as shown in Table 2.

In Table 2, the initial battery resistance (25° C.) of Example 2 is represented as a relative value to the case in which the initial battery resistance (25° C.) of Comparative Example 2 is 100, and the initial battery resistance of Example 2 (−20° C.) is represented as a relative value to the case in which the initial battery resistance (−20° C.) of Comparative Example 2 is 100.

TABLE 2

| | Additive in nonaqueous electrolyte solution | | | | | | Initial battery resistance (relative value) | |
|---|---|---|---|---|---|---|---|---|
| | Additive A | | | Additive B | | | | |
| | Kind | Reductive decomposition potential (V) | Addition amount (wt %) | Kind | Reductive decomposition potential (V) | Addition amount (wt %) | 25° C. | −20° C. |
| Comparative Example 2 | None | — | — | Cyclic sulfuric acid ester (1) | 1.2 | 1.0 | 100 | 100 |
| Example 2 | Lithium tetraborate | 2.1 | 0.1 | Cyclic sulfuric acid ester (1) | 1.2 | 1.0 | 86 | 68 |

As shown in Table 2, in Example 2 in which a nonaqueous electrolyte solution containing additive A and additive B is used, the initial battery resistance was decreased, as compared with Comparative Example 2 in which a nonaqueous electrolyte solution containing additive B and not containing additive A was used.

Example 3 and Comparative Example 3

Evaluation was performed in the same manner as in each of Example 1 and Comparative Example 1, except that the kind and addition amount of additive B were changed as shown in Table 3.

In Table 3, the initial battery resistance (25° C.) of Example 3 is represented as a relative value to the case in which the initial battery resistance (25° C.) of Comparative Example 3 is 100, and the initial battery resistance of Example 3 (−20° C.) is represented as a relative value to the case in which the initial battery resistance (−20° C.) of Comparative Example 3 is 100.

In Table 3, Table 5, Table 8, and Table 9, VC represents vinylene carbonate as a carbonate compound having a carbon-carbon unsaturated bond.

TABLE 3

| | Additive in nonaqueous electrolyte solution | | | | | | Initial battery resistance (relative value) | |
|---|---|---|---|---|---|---|---|---|
| | Additive A | | | Additive B | | | | |
| | Kind | Reductive decomposition potential (V) | Addition amount (wt %) | Kind | Reductive decomposition potential (V) | Addition amount (wt %) | 25° C. | −20° C. |
| Comparative Example 3 | None | — | — | Cyclic sulfuric acid ester (1) | 1.2 | 0.5 | 100 | 100 |
| | | | | VC | 1.1 | 0.2 | | |
| Example 3 | Lithium tetraborate | 2.1 | 0.1 | Cyclic sulfuric acid ester (1) | 1.2 | 0.5 | 100 | 69 |
| | | | | VC | 1.1 | 0.2 | | |

As shown in Table 3, in Example 3 in which a nonaqueous electrolyte solution containing additive A and additive B is used, the initial battery resistance was decreased, as compared with Comparative Example 3 in which a nonaqueous electrolyte solution containing additive B and not containing additive A was used.

Example 4 and Comparative Example 4

Evaluation was performed in the same manner as in each of Example 1 and Comparative Example 1, except that the kind and addition amount of additive B were changed as shown in Table 4.

In Table 4, the initial battery resistance (25° C.) of Example 4 is represented as a relative value to the case in which the initial battery resistance (25° C.) of Comparative Example 4 is 100, and the initial battery resistance of Example 4 (−20° C.) is represented as a relative value to the case in which the initial battery resistance (−20° C.) of Comparative Example 4 is 100.

In Table 4, TMSP represents tristrimethylsilyl phosphate as a phosphoric acid ester compound.

TABLE 4

| | Additive in nonaqueous electrolyte solution | | | | | Initial battery resistance (relative value) | |
|---|---|---|---|---|---|---|---|
| | Additive A | | | Additive B | | | |
| | Kind | Reductive decomposition potential (V) | Addition amount (wt %) | Kind | Reductive decomposition potential (V) | Addition amount (wt %) | 25° C. | −20° C. |
| Comparative Example 4 | None | — | — | TMSP | 0.9 | 0.2 | 100 | 100 |
| Example 4 | Lithium tetraborate | 2.1 | 0.1 | TMSP | 0.9 | 0.2 | 93 | 94 |

As shown in Table 4, in Example 4 in which a nonaqueous electrolyte solution containing additive A and additive B is used, the initial battery resistance was decreased, as compared with Comparative Example 4 in which a nonaqueous electrolyte solution containing additive B and not containing additive A was used.

Example 5 and Comparative Example 5

Evaluation was performed in the same manner as in each of Example 1 and Comparative Example 1, except that the kind of additive B was changed as shown in Table 5.

In Table 5, the initial battery resistance (25° C.) of Example 5 is represented as a relative value to the case in which the initial battery resistance (25° C.) of Comparative Example 5 is 100, and the initial battery resistance of Example 5 (−20° C.) is represented as a relative value to the case in which the initial battery resistance (−20° C.) of Comparative Example 5 is 100.

TABLE 5

| | Additive in nonaqueous electrolyte solution | | | | | Initial battery resistance (relative value) | |
|---|---|---|---|---|---|---|---|
| | Additive A | | | Additive B | | | |
| | Kind | Reductive decomposition potential (V) | Addition amount (wt %) | Kind | Reductive decomposition potential (V) | Addition amount (wt %) | 25° C. | −20° C. |
| Comparative Example 5 | None | — | — | VC | 1.1 | 0.5 | 100 | 100 |
| Example 5 | Lithium tetraborate | 2.1 | 0.1 | VC | 1.1 | 0.5 | 91 | 83 |

As shown in Table 5, in Example 5 in which a nonaqueous electrolyte solution containing additive A and additive B is used, the initial battery resistance was decreased, as compared with Comparative Example 5 in which a nonaqueous electrolyte solution containing additive B and not containing additive A was used.

Example 6 and Comparative Example 6

Evaluation was performed in the same manner as in each of Example 1 and Comparative Example 1, except that the kind of additive B was changed as shown in Table 6.

In Table 6, the initial battery resistance (25° C.) of Example 6 is represented as a relative value to the case in which the initial battery resistance (25° C.) of Comparative Example 6 is 100, and the initial battery resistance of Example 6 (−20° C.) is represented as a relative value to the case in which the initial battery resistance (−20° C.) of Comparative Example 6 is 100.

In Table 6, LiDFP represents lithium difluorophosphate as a phosphorus acid ester compound.

TABLE 6

| | Additive in nonaqueous electrolyte solution | | | | | | Initial battery resistance (relative value) | |
| --- | --- | --- | --- | --- | --- | --- | --- | --- |
| | Additive A | | | Additive B | | | | |
| | Kind | Reductive decomposition potential (V) | Addition amount (wt %) | Kind | Reductive decomposition potential (V) | Addition amount (wt %) | 25° C. | −20° C. |
| Comparative Example 6 | None | — | — | LiDFP | 1.1 | 0.5 | 100 | 100 |
| Example 6 | Lithium tetraborate | 2.1 | 0.1 | LiDFP | 1.1 | 0.5 | 100 | 87 |

As shown in Table 6, in Example 6 in which a nonaqueous electrolyte solution containing additive A and additive B is used, the initial battery resistance was decreased, as compared with Comparative Example 6 in which a nonaqueous electrolyte solution containing additive B and not containing additive A was used.

Example 7 and Comparative Example 7

Evaluation was performed in the same manner as in each of Example 1 and Comparative Example 1, except that the kind and addition amount of additive B were changed as shown in Table 7.

In Table 7, the initial battery resistance (25° C.) of Example 7 is represented as a relative value to the case in which the initial battery resistance (25° C.) of Comparative Example 7 is 100, and the initial battery resistance of Example 7 (−20° C.) is represented as a relative value to the case in which the initial battery resistance (−20° C.) of Comparative Example 7 is 100.

In Table 7, LiBOB represents lithium bis(oxalato) borate as an oxalato compound.

TABLE 7

| | Additive in nonaqueous electrolyte solution | | | | | | Initial battery resistance (relative value) | |
| --- | --- | --- | --- | --- | --- | --- | --- | --- |
| | Additive A | | | Additive B | | | | |
| | Kind | Reductive decomposition potential (V) | Addition amount (wt %) | Kind | Reductive decomposition potential (V) | Addition amount (wt %) | 25° C. | −20° C. |
| Comparative Example 7 | None | — | — | LiBOB | 1.8 | 1.0 | 100 | 100 |
| Example 7 | Lithium tetraborate | 2.1 | 0.1 | LiBOB | 1.8 | 1.0 | 95 | 85 |

As shown in Table 7, in Example 7 in which a nonaqueous electrolyte solution containing additive A and additive B is used, the initial battery resistance was decreased, as compared with Comparative Example 7 in which a nonaqueous electrolyte solution containing additive B and not containing additive A was used.

Example 8 and Comparative Example 8

Evaluation was performed in the same manner as in each of Example 1 and Comparative Example 1, except that the kind and addition amount of additive B were changed as shown in Table 8.

In Table 8, the initial battery resistance (25° C.) of Example 8 is represented as a relative value to the case in which the initial battery resistance (25° C.) of Comparative Example 8 is 100, and the initial battery resistance of Example 8 (−20° C.) is represented as a relative value to the case in which the initial battery resistance (−20° C.) of Comparative Example 8 is 100.

In Table 8, PRS represents 1,3-propene sultone as a sultone compound.

TABLE 8

| | Additive in nonaqueous electrolyte solution | | | | | Initial battery resistance (relative value) | |
|---|---|---|---|---|---|---|---|
| | Additive A | | | Additive B | | | |
| | Kind | Reductive decomposition potential (V) | Addition amount (wt %) | Kind | Reductive decomposition potential (V) | Addition amount (wt %) | 25° C. | −20° C. |
| Comparative Example 8 | None | — | — | PRS<br>VC | 1.4<br>1.1 | 0.5<br>0.2 | 100 | 100 |
| Example 8 | Lithium tetraborate | 2.1 | 0.5 | PRS<br>VC | 1.4<br>1.1 | 0.5<br>0.2 | 85 | 69 |

As shown in Table 8, in Example 8 in which a nonaqueous electrolyte solution containing additive A and additive B is used, the initial battery resistance was decreased, as compared with Comparative Example 8 in which a nonaqueous electrolyte solution containing additive B and not containing additive A was used.

[Evaluation of Increase in Resistance Due to Storage]

For Examples 1 to 8, a battery resistance (−20° C.) increase rate [after storage/initial stage] was measured as follows.

First, the initial battery resistance (−20° C.) was measured by the method described above.

Next, a coin type battery of which the initial battery resistance (−20° C.) was measured was charged at a constant voltage of 4.2 V, and the charged coin type battery was stored in a thermostatic bath at 80° C. for 2 days.

The coin type battery after storage for 2 days was set to a constant voltage of 3.9 V, and the DC resistance [Ω] of the coin type battery at −20° C. was measured in the same manner as in the initial battery resistance (−20° C.). The obtained value was defined as the battery resistance after storage (−20° C.).

For the coin type battery of each example, the battery resistance after storage (−20° C.) was divided by the initial battery resistance (−20° C.), thereby determining the battery resistance (−20° C.) increase rate [after storage/initial stage].

The above results are shown in Table 9.

Reference Example

A coin type battery was produced in the same manner as in Example 1, except that Additive B was not used, and the battery resistance (−20° C.) increase rate [after storage/initial stage] was determined in the same manner as in Example 1.

The results are shown in Table 9.

TABLE 9

| | Additive in nonaqueous electrolyte solution | | | | | | Battery resistance (−20° C.) increase rate/[after storage/initial stage] |
|---|---|---|---|---|---|---|---|
| | Additive A | | | Additive B | | | |
| | Kind | Reductive decomposition potential (V) | Addition amount (wt %) | Kind | Reductive decomposition potential (V) | Addition amount (wt %) | |
| Reference Example | Lithium tetraborate | 2.1 | 0.1 | None | — | — | 1.23 |
| Example 1 | Lithium tetraborate | 2.1 | 0.1 | Cyclic sulfuric acid ester (1) | 1.2 | 0.5 | 1.14 |
| Example 2 | Lithium tetraborate | 2.1 | 0.1 | Cyclic sulfuric acid ester (1) | 1.2 | 1.0 | 1.16 |
| Example 3 | Lithium tetraborate | 2.1 | 0.1 | Cyclic sulfuric acid ester (1)<br>VC | 1.2<br>1.1 | 0.5<br>0.2 | 0.96 |
| Example 4 | Lithium tetraborate | 2.1 | 0.1 | TMSP | 0.9 | 0.2 | 1.21 |
| Example 5 | Lithium tetraborate | 2.1 | 0.1 | VC | 1.1 | 0.5 | 0.87 |
| Example 6 | Lithium tetraborate | 2.1 | 0.1 | LiDFP | 1.1 | 0.5 | 1.13 |
| Example 7 | Lithium tetraborate | 2.1 | 0.1 | LiBOB | 1.8 | 1.0 | 0.31 |
| Example 8 | Lithium tetraborate | 2.1 | 0.5 | PRS<br>VC | 1.4<br>1.1 | 0.5<br>0.2 | 0.62 |

As shown in Table 9, in Examples 1 to 8 in which a nonaqueous electrolyte solution containing additive A and additive B is used, the battery resistance (−20° C.) increase rate [after storage initial stage] was decreased (that is, an increase in battery resistance due to storage was suppressed), as compared with the Reference Example in which a nonaqueous electrolyte solution containing additive A and not containing additive B was used.

The disclosure of Japanese Patent Application No. 2017-161287 filed on Aug. 24, 2017 is incorporated herein by reference in its entirety.

All documents, patent applications, and technical standards mentioned herein are incorporated herein by reference to the same extent as if each of the individual documents, patent applications, and technical standards was specifically and individually stated to be incorporated by reference.

The invention claimed is:

1. A lithium secondary battery, comprising:
a positive electrode;
a negative electrode containing a negative electrode active material that is a carbon material which is capable of being doped/undoped with lithium ions; and
a nonaqueous electrolyte solution for a battery, the solution comprising:
an additive A composed of a boron compound represented by the following Formula (1); and
an additive B composed of a compound having a lower reductive decomposition potential than the additive A:

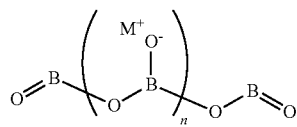

(1)

wherein, in Formula (1), n represents an integer from 1 to 5, $M^+$ represents an $Li^+$ ion or an $H^+$ ion, and when n is an integer from 2 to 5, more than one $M^+$ may be the same as or different from each other, wherein the additive B is at least one selected from the group consisting of vinyl ethylene carbonate, 1,3-propene sultone, 4-methylsulfonyloxymethyl-2,2-dioxo-1,3,2-dioxathiolane, 4,4'-bis(2,2-dioxo-1,3,2-dioxathiolane), 4-propyl-2,2-dioxo-1,3,2-dioxathiolane, lithium difluorophosphate, tristrimethylsilyl phosphate, lithium difluorobis(oxalato) phosphate, orthofluorotoluene, (perfluorohexyl) ethylene, succinonitrile, adiponitrile, methanesulfonyl fluoride, and lithium trifluoromethanesulfonate, and wherein, when an absolute value of the reductive decomposition potential of the boron compound configuring the additive A is a reductive decomposition potential A, and an absolute value of the reductive decomposition potential of the compound configuring the additive B is a reductive decomposition potential B, a value obtained by subtracting the reductive decomposition potential B from the reductive decomposition potential A is from 0.1 V to 1.4 V.

2. The lithium secondary battery according to claim 1, wherein, the reductive decomposition potential B is from 0.9 V to 2.0 V.

3. The lithium secondary battery according to claim 1, wherein $M^+$ in Formula (1) is an $Li^+$ ion.

4. The lithium secondary battery according to claim 1, wherein a content of the additive B with respect to a total amount of the nonaqueous electrolyte solution for a battery is from 0.001% by mass to 10% by mass.

5. The lithium secondary battery according to claim 1, wherein a content of the additive A with respect to a total amount of the nonaqueous electrolyte solution for a battery is from 0.001% by mass to 10% by mass.

6. The lithium secondary battery according to claim 1, wherein a content mass ratio of the additive B to the additive A is from more than 1 to 20.

7. A lithium secondary battery obtained by charging and discharging the lithium secondary battery according to claim 1.

* * * * *